R. O. BRITTAIN.
ARTIFICIAL TOOTH.
APPLICATION FILED JAN. 5, 1917.
1,249,891.   Patented Dec. 11, 1917.
Fig. 1.  Fig. 2.  Fig. 3.
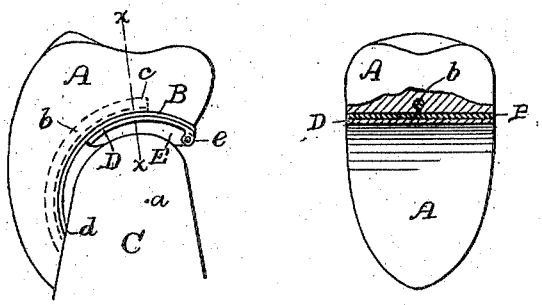
Fig. 4.   Fig. 5.
  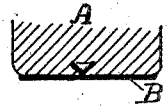 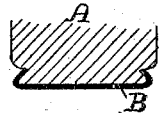
Fig. 6.   Fig. 7.   Fig. 8.   Fig. 9.
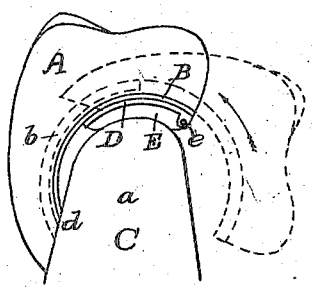
Fig. 10.
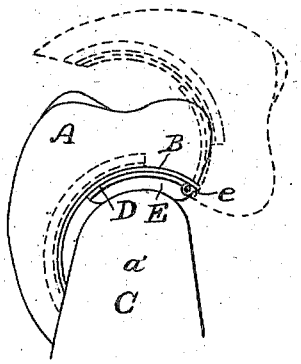
Fig. 11.
Witnesses:
Ella J. Brings
Lewis S. Larsen.
Inventor:
Robert O. Brittain,
By Oscar A. Perrigo
ATTORNEY.

UNITED STATES PATENT OFFICE.

ROBERT O. BRITTAIN, OF BOSTON, MASSACHUSETTS.

ARTIFICIAL TOOTH.

1,249,891.  Specification of Letters Patent.  Patented Dec. 11, 1917.

Application filed January 5, 1917. Serial No. 140,839.

*To all whom it may concern:*

Be it known that I, ROBERT O. BRITTAIN, a citizen of the United States, residing at Boston, in the county of Suffolk and State of Massachusetts, have invented a new and useful Improvement in Artificial Teeth, of which the following is a specification.

My invention relates generally to dental work in supplying artificial teeth to take the place of natural ones that have been removed; and particularly in that class of dental work commonly known as "bridge work."

My object in making this invention is to provide a convenient and secure method of attaching a porcelain tooth to the metallic backing used in bridge work.

I am aware that porcelain teeth have been constructed with a straight groove into which was fitted a projecting ridge formed upon a flat plate, which in turn was soldered to the bridge. The tooth and this flat plate were fixed to each other by cement. In practice it was found that such a method of attachment was not always sufficiently secure, and that the frontal aspect of the tooth resting against the gum had to be "boxed in," or inclosed in a metallic rim so formed as to give additional security and support.

In my device the inside of the porcelain tooth is cut out in a semi-circular form partially conforming to the shape of the gum and providing a largely increased area of bearing surface for the attachment and support of the tooth. The details are clearly shown in the drawing, in which:

Figure 1 is a front view of the tooth, shown natural size.

Fig. 2 is a side elevation; and

Fig. 3 is a rear elevation of the same.

Fig. 4 is a side elevation, and

Fig. 5 is a rear elevation, partly in section on the line $x$, $x$, Fig. 4, enlarged four times the natural size.

Figs. 6, 7, 8 and 9 are cross sections of various methods of securing the porcelain tooth to the metallic plate.

Fig. 10 is a side elevation showing the method of placing the tooth into position on the metallic plate; and Fig. 11 is a similar view showing the position of the tooth for the purpose of cleansing.

Similar reference letters denote similar parts in the several views.

Referring to Fig. 4, the artificial tooth A, is formed with a cylindrical surface on its under and rear sides, the center of which is at $a$. In the center of this surface is formed a vertical slot as shown at $b$, Fig. 5, in which fits a corresponding web on the supporting plate or backing B.

The form shown is given as one of the simple forms, although other forms are shown in Figs. 7 and 8, which may be used if desired. A fourth form is shown in Fig. 9, in which the supporting plate B, has its edges turned up to form a dovetail into which fits corresponding grooves in the sides of the tooth A. The plate B, extends from the point $c$, directly over the center $a$, to the point $d$, on the outer line of the gum C.

As the circular recess in the tooth A, the curvature of the slot $b$, and the curve of the supporting plate B, are all on the arc of a circle whose center is at $a$, it follows that a tooth so constructed, when placed as shown in dotted lines in Fig. 10, may be freely moved in direction of the arrow until it arrives at the position shown in full lines, which is its operative position.

The supporting plate or backing B, is, in this case, connected to the bridge plate D, by the hinge $e$, formed in the usual manner, and having fixed to its under side the mass of solder E, resting upon and supported by the gum C, in the usual manner. By the use of this hinge $e$, the tooth may be swung over to the position shown in dotted lines in Fig. 11, for the purpose of cleansing and as readily returned to its operative position.

Another desirable feature of the construction described above should be noted. Assuming that the curvature of the plate B, is as shown, and that the curvature of the inside of the tooth A, is somewhat less, the operation of forcing the tooth to the position shown by full lines will bind the two strongly together and form a very secure and strong construction not heretofore realized by any form of which I am aware.

Having described the construction and operation of my device I claim:

1. An artificial tooth having a concaved under surface, in combination with a curved plate fitting said concaved surface, and means for attaching these two parts to each other.

2. An artificial tooth having a concaved under surface, a dovetail channel in said surface at right angles to its axis, and a curved plate fitting said concaved surface and having fixed to its outer surface a projecting rib adapted to fit in the dovetail channel in said tooth.

3. An artificial tooth having formed in its rear part a cylindrical recess comprising slightly more than a half circle, and a curved plate comprising slightly more than a half circle and of a radius slightly greater than that of the recess in said tooth.

4. In a device of the character described, the combination of an artificial tooth having formed in its rear surface a cylindrical recess, a dovetail channel in said recess at right angles to its axis, a curved plate fitting said cylindrical recess and having fixed to its upper surface a projecting rib adapted to fit in said dovetail channel and a hinge member formed upon one end, a second plate having a hinge member formed at one end adapting it to be hinged to the first hinge member, and means for fixing said second plate to existing teeth.

ROBERT O. BRITTAIN.

Copies of this patent may be obtained for five cents each, by addressing the "Commissioner of Patents, Washington, D. C."